Patented Nov. 17, 1925.

1,561,955

UNITED STATES PATENT OFFICE.

JOKICHI TAKAMINE, JR., OF CLIFTON, NEW JERSEY, ASSIGNOR TO TAKAMINE FERMENT COMPANY, OF NEW YORK, N. Y., A CORPORATION OF WEST VIRGINIA.

ENZYMIC BEVERAGE.

No Drawing.     Application filed November 17, 1919. Serial No. 338,763.

*To all whom it may concern:*

Be it known that I, JOKICHI TAKAMINE, Jr., a subject of the Emperor of Japan, residing at Clifton, county of Passaic, State of New Jersey, have made a certain new and useful Invention in Enzymic Beverages, of which the following is a specification.

This invention relates to beverages.

The object of the invention is to provide a beverage which is healthful and has digestive properties.

A further object of the invention is to provide a beverage which may be made palatable and tasty, and which at the same time will have medicinal properties and aid in digesting food.

Further objects of the invention will appear more fully hereinafter.

The invention consists substantially in the beverage, its composition, and the process of making same, all as will be more fully hereinafter set forth.

In accordance with my invention I propose to provide a beverage consisting of an enzyme or enzymes containing powers of digesting various kinds of foods, that is, proteins and carbohydrates, and I have discovered that the enzyme extracted from the aspergillus oryzæ contains these properties. I have discovered that these soluble enzymes are held practically stable in a saccharine solution and that no antiseptic is required to be added. Such a beverage may be manufactured and distributed in any suitable manner, either at a soda fountain, or the like, or bottled in the desired quantities and distributed in that manner. Also to the enzymic saccharine solution may be added a suitable palatable and distinctive flavor. If desired an organic vegetable compound may be added to the beverage to give a foam when carbonated water is added. One example of the product and means of obtaining the same is as follows: To one-hundred parts or enzymic solution is added seventy-five parts of sugar, preferably cane sugar. The sugar is allowed to dissolve, forming with the solution a thick syrup. A suitable flavoring is then added either in the form of essential oils or as extracts fresh fruit juices in any desirable quantity to suit varying tastes. Further, a suitable harmless coloring material may be added, if desired. The resulting product I have discovered is a delicious drink, having great beneficial properties, principal among which is that of digesting the various forms of food eaten and thereby aiding in body metabolism, and at the same time the drink has no harmful property whatever, and is cheap, and easily handled. I do not desire, however, to confine myself to the enzymes of the aspergillus oryzæ for the same may be a combination of various enzymes from various sources, i. e., pepsin, trypsin, pancreatin, lipase, etc., nor do I desire to be limited to any particular flavor or color. I prefer, however, to use enzymes from aspergillus oryzæ as I have found that the same act on proteins, viz, breaking same down to peptones, and amino acids, also coagulating milk like rennin or pepsin. The beverage acts on starchy food to digest same to soluble starch, dextrin, maltose and dextrose. If desired the beverage may be sold in thick syrup form to which may be added water or carbonated water by the user as and when desired. I have found that the beverage may be kept for great lengths of time without harmful effect.

Many modifications and changes in the variable elements above enumerated will readily suggest themselves to those skilled in the art without departing from the spirit and scope of my invention as defined in the claims. Therefore what I claim as new and useful and of my own invention and desire to secure by Letters Patent is,—

1. The process of making an enzyme containing beverage having diastatic and proteolitic properties which comprises isolating a water soluble enzymic compound of vegetable fungus origin, and mixing therewith dissolved cane sugar to a thick syrup suitable for dilution with water.

2. An enzymic beverage having diastatic and proteolitic powers comprising a syrup formed of a solution of sugar and containing enzyme of vegetable fungus origin.

3. A syrup for obtaining an enzyme containing beverage having digestive powers and comprising a liquid containing approximately seventy five per cent sugar with every hundred per cent of an enzymic compound including an enzyme of vegetable fungus origin.

In testimony whereof I have hereunto set my hand on this 28th day of August A. D., 1919.

JOKICHI TAKAMINE, JR.